United States Patent [19]

Niwa et al.

[11] Patent Number: 5,600,867
[45] Date of Patent: Feb. 11, 1997

[54] CAR KILN WHEEL HAVING SILICON NITRIDE ROTATING MEMBERS

[75] Inventors: Tomonori Niwa; Tetsuji Yogo, both of Nagoya, Japan

[73] Assignee: NGK Spark Plug Co., Ltd., Nagoya, Japan

[21] Appl. No.: 299,416

[22] Filed: Sep. 1, 1994

[30] Foreign Application Priority Data

Sep. 1, 1993 [JP] Japan .................. 5-052977 U

[51] Int. Cl.⁶ .................. A47B 91/00; B60B 33/00
[52] U.S. Cl. .................. 16/45; 384/492
[58] Field of Search .................. 16/45, 46, 47, 16/21, 22, 26, 27; 384/907.1, 492

[56] References Cited

U.S. PATENT DOCUMENTS

| | | | |
|---|---|---|---|
| 1,367,610 | 2/1921 | Lehmann | 384/504 |
| 1,373,139 | 3/1921 | Lindman | 384/506 |
| 2,742,663 | 4/1956 | Meadows | 16/45 |
| 3,705,714 | 12/1972 | Alliegro | 432/241 |
| 3,958,847 | 5/1976 | Cain et al. | 384/504 |
| 4,634,300 | 1/1987 | Takebayashi et al. | 384/492 |
| 4,799,810 | 1/1989 | Gilbert | 384/492 |
| 5,064,298 | 11/1991 | Hibi et al. | 384/492 |
| 5,163,757 | 11/1992 | Graham | 384/492 |
| 5,176,456 | 1/1993 | Takebayashi et al. | 384/492 |
| 5,228,786 | 7/1993 | Tanimoto et al. | 384/492 |
| 5,306,565 | 4/1994 | Corbin et al. | 384/907.1 |

FOREIGN PATENT DOCUMENTS 0304872  3/1989  European Pat. Off. .............. 384/492

*Primary Examiner*—Chuck Y. Mah
*Attorney, Agent, or Firm*—Foley & Lardner

[57] ABSTRACT

A bearing type wheel for a car which rollers through a car tunnel kiln, includes a plurality of rotating members such as rollers or balls interposed between respective inner rings and an outer ring. Each of the rotating members consists essentially of a sintered body of silicon nitride base ($Si_3N_4$) ceramic.

15 Claims, 2 Drawing Sheets

5,600,867

CAR KILN WHEEL HAVING SILICON NITRIDE ROTATING MEMBERS

BACKGROUND OF THE INVENTION

1. Field of the Invention

The present invention relates to a bearing type wheel for use in a car for a furnace or kiln, particularly for use in a car which moves through a car tunnel kiln whilst carrying thereon formed ceramic products so that the formed ceramic products are fired during movement of the car through the kiln.

2. Background of the Invention

In case of producing ceramic products continuously and in a large quantity, a tunnel kiln is used for firing formed ceramic products during movement of the formed ceramic products from the entrance to the exit of the kiln. To this end, the formed ceramic products are carried on a car which rolls on a track extending through the kiln.

A wheel of the car is of a roll bearing type and constituted by two inner rings installed on an axle of the car for rotation therewith, an intermediate ring installed on the axle of the car at a location intermediate between the inner rings, an outer ring of the width equal to the sum of the widths of the two inner rings and the intermediate ring and disposed concentrically of the inner rings and the intermediate ring, and a plurality of rollers interposed between the respective inner rings and the outer ring. The constituent parts of the wheel are made of metals similar to those of a bearing for a machine tool, for example, the rollers are made of SKD 61 (alloy steel according to Japanese Industrial Standard).

During movement of the car through the kiln, the wheels are exposed to the atmosphere of a high temperature. Accordingly, in case of a car whose wheels are entirely made of metal, a large force is necessitated for pulling the car since the function of the car is deteriorated due to the surface oxidation, plastic deformation and wearing. Further, the rollers finally lose its original form and are disabled to function properly, thus requiring replacement of the wheels and thus increasing the man-hour in the production of the ceramic products.

SUMMARY OF THE INVENTION

According to an aspect of the present invention, there is provided a wheel for a car for a kiln. The wheel comprises concentric inner and outer rings defining therebetween an annular space, and a plurality of rotating members installed in the space between the inner and outer rings. Each of the rotating members consists essentially of a sintered body of silicon nitride ($Si_3N_4$) base ceramic. According to one aspect of the present invention, each of the rotating members is in the form of a ball. According to another aspect of the present invention, each of the rotating members is in the form of a roller. According to a further aspect of the present invention each of the rotating members has a finished surface which is rougher than a mirror finished surface. According to a further aspect of the present invention, the silicon nitride ($Si_3N_4$) base ceramic includes alumina ($Al_2O_3$) and yttria ($Y_2O_3$).

According to a further aspect of the present invention, there is provided a bearing type wheel for a car for a kiln. The bearing type wheel comprises an inner ring for installation on an axle of the car for rotation therewith and having an outer circumferential surface, an outer ring disposed concentrically with the inner ring and having an inner circumferential surface, and a plurality of rotating members interposed between the inner ring and the outer ring for rolling on the inner and outer circumferential surfaces of the inner ring and the outer rings. Each of said rotating members consists essentially of a sintered body of silicon nitride ($Si_3N_4$) base ceramic.

According to a further aspect off the present invention, there is provided a bearing type wheel for a car for a car tunnel kiln. The bearing type wheel comprises a pair of inner rings for installation on an axle of the car for rotation therewith, an intermediate ring for installation on the axle of the car at a location between the inner rings, an outer ring disposed concentricaly with the inner rings and the intermediate rings to define a pair of annular spaces between the respective inner rings and to the outer ring, and a plurality of rotating members installed in the spaces. Each of the rotating members consists essentially of a sintered body of silicon nitride ($Si_3N_4$) base ceramic.

The above structure is effective for solving the above noted problem inherent in the prior art wheel.

It is accordingly an object of the present invention to provide a novel and improved bearing type wheel for a car for a car tunnel kiln, which can attain an elongated life.

It is a further object of the present invention to provide a bearing type wheel of the above described character which can reduce the man-hour in firing of ceramic products and thus can reduce the cost of the products.

DETAILED DESCRIPTION OF THE PREFERRED EMBODIMENT

Figure 1:
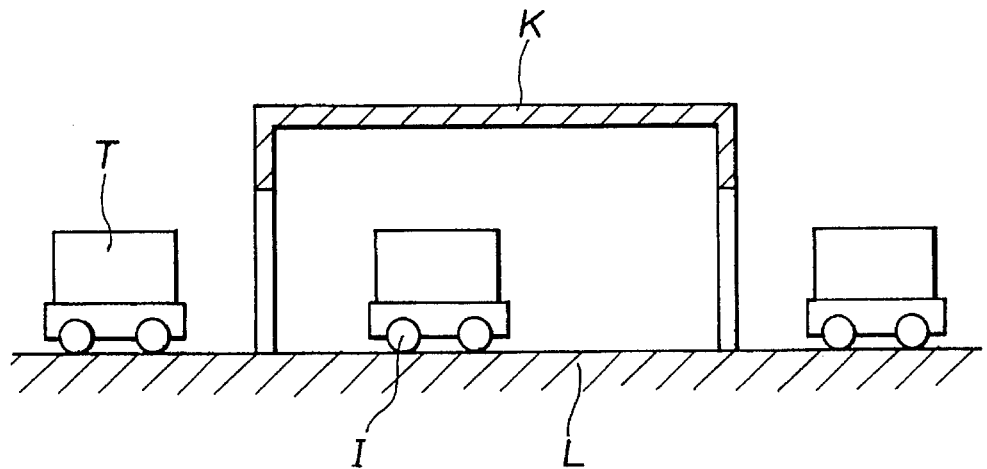
FIG. 1 is a diagrammatic view of a car together with a car tunnel kiln.

Referring to first to FIG. 1, a car tunnel kiln is indicated by "K". A car "T" carrying thereon formed ceramic products (not shown) and adapted to roll on a track "L" is pulled through the kiln "K" for thereby firing the formed ceramic products.

Figure 2:
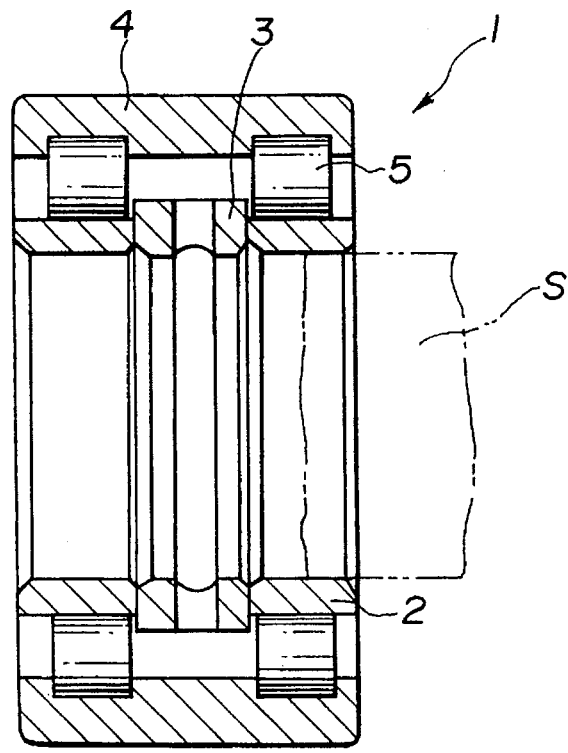
FIG. 2 is a sectional view of a wheel according to an embodiment of the present invention, which is taken along an axis thereof.

Referring additionally to FIG. 2, a bearing type wheel is generally indicated by 1 and includes two inner rings 2 (49 mm in outer diameter) mounted or installed on an axle "S" (40 mm in diameter) of the car "T" for rotation therewith, an intermediate ring 3 installed on the axle "S" at a location between the inner rings 2, an outer ring 4 (80 mm in outer diameter) of the width equal to the sum of the widths of the two inner rings 2 and the intermediate ring 3, disposed concentrically with the inner rings 2 and the intermediate ring 3, and eighteen rollers 5 interposed between the respective inner rings 2 and the outer ring 4 and thus disposed on the opposite sides of the intermediate ring 3.

The inner rings 2, intermediate ring 3 and outer ring 4 of the wheel 1 are made of SKD 61 (alloy tool steel according to Japanese Industrial Standard). Each of the rollers 5 consists essentially of a sintered body of silicon nitride ($Si_3N_4$) base ceramic and is produced in the following manner.

Powders consisting of 90 wt. % $Si_3N_4$ powder of the average grain diameter of 0.8 μm, 5 wt. % $Y_2O_3$ powder of the specific surface of 10 m³/g and 5 wt. % $Al_2O_3$ powder of the specific surface of 8 m³/g are mixed by a wet method using silicon nitride balls and a silicon nitride mill.

The mixture of powders is dried and then compacted or formed into a predetermined shape by a hydrostatic pressing and under a pressure of 2 ton/cm². A compact or a formed ceramic product is fired by being held in a pressurized nitrogen gas of the temperature of 1750° C. for two hours. By this, the roller 5 made up of a sintered body of silicon nitride ($Si_3N_4$) base ceramic, of the diameter of 10 mm and of the length 10 mm length is obtained.

After firing, the surface of each of the rollers 5 is finished to have a predetermined surface roughness by grinding as shown in Table 1. In this connection, the rollers 5 need not to be finished so as to have mirror finished surfaces, i.e., need not to be finished to have a surface roughness (Ra) which is smaller than 0.05a according to Japanese Industrial Standard. Generally, ceramic products used as sliding or rotating parts for machine tools need to be finished so as to have mirror surfaces. However, the wheels 1 of the car "T" rotate at low speed differing from the sliding or rotating parts of the machine tools which rotate at relatively high speed, so the rollers 5 for use in the car "T" need not to be finished so as to have mirror surfaces.

The above described wheel 1 was installed on car T of the total weight of 500 kg and the traction force of the car "T" was measured. After that, the car T was used for four months at the maximum temperature of 1500° C. and under the condition that it was moved through a heavy oil-fired tunnel kiln of the overall length of 30 m at the speed of 2 m/min. and then the traction force was measured once again. The result of the measurement was shown in Table I.

For comparison, the traction force of a comparative car which was the same with that of the present invention except that the rollers were made of SKD 61 (alloy tool steel according to Japanese Industrial Standard) was measured under the same condition described as above. The result is also shown in Table I.

In the meantime, the judgment of the life was made in such a manner that the life expired when the wheels became immovable.

TABLE I

| No. | Life | Traction Force of Car (Kg) Initial Use | Traction Force of Car (Kg) After Use | Surface Roughness (Ra) | Remarks |
|---|---|---|---|---|---|
| 1 | 2 years or more | 11 | 7 | 0.2 | Invention |
| 2 | 2 years or more | 11 | 7 | 0.1 | Invention |
| 3 | 2 years or more | 10 | 7 | 0.05 | Invention |
| R | 6 months | 10 | 15 | 0.01 | Comparative Example |

As shown in Table I, the prior art wheel required a larger traction force at initial use (i.e., at first use after installation) than that after use (i.e., after four-month use). That is, the function of the rollers was deteriorated or lowered by use. As a result, the life was 6 months at the longest.

In contrast to this, the wheels of the present invention required a smaller traction force after use than that at initial use. That is, the function of the rollers became higher by use.

As a result, the life of the wheels was elongated to be two years or more. It is considered that this is because of the fact that the rollers are formed from a sintered body of silicon nitride base ceramic so that there was not caused almost any oxidation, plastic deformation and wearing of the rollers during use.

From the foregoing, it will be understood that with the above structure of the present invention makes it possible to elongate the life of the wheel and reduce the number of times of replacement of the wheels. As a result, it becomes possible to reduce the man-hour for firing the products. Further, by the use of the car for a week or so after installation of new wheels, the traction force of the car is reduce, thus making it possible to reduce the load of the worker.

Figure 3:
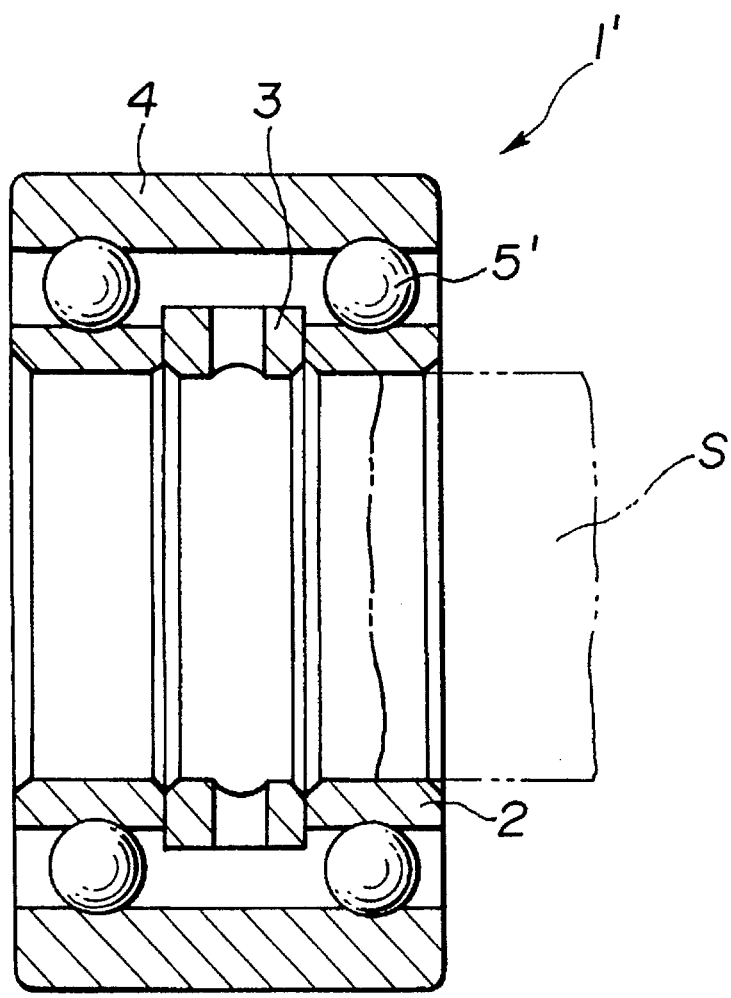
FIG. 3 is a sectional view of a wheel according to another embodiment of the present invention, which is taken along an axis thereof.

FIG. 3 shows a wheel 1' according to a further embodiment. This embodiment is substantially similar to the previous embodiment of FIG. 2 except that a plurality of balls 5' are interposed between the respective inner rings 2 and the outer ring 4, each of which rollers 5' consists essentially of a sintered body of silicon nitride ($Si_3N_4$) base ceramic. This embodiment can produce substantially the same effect as the previous embodiment of FIG. 2.

In the foregoing, it is to be noted that the term "sintered body of silicon nitride ($Si_3N_4$) base ceramic" is intended to include a sintered body in which a certain amount of silicon nitride ($Si_3N_4$) cooperate with alumina ($Al_2O_3$) to constitute sialon as well as a sintered body including crystallized silicon nitride as a major constituent.

It is further to be noted that since the rollers are made up of silicon nitride base ceramic which is excellent in wear resistance, oxidation resistance and resistance to plastic deformation the surface oxidation, wearing and deformation of the rollers are hard to occur. Further, since a sintered body of silicon nitride base ceramic is particularly high in strength and toughness among known ceramics, chipping or breakage of the rollers are hard to occur even under a high load, so the wheel of this invention is highly reliable in operation.

What is claimed is:

1. A kiln car wheel comprising:

concentric inner and outer rings defining therebetween an annular space; and a plurality of rotating members installed in said space between said inner and outer rings;

wherein each of said rotating members consists essentially of a sintered body of silicon nitride ($Si_3N_4$) base ceramic; and wherein each of said rotating members has a finished surface roughness (Ra) greater than 0.05; which is rougher than a mirror finished surface.

2. A wheel according to claim 1, wherein each of said rotating members is in the form of a ball.

3. A wheel according to claim 1, wherein each of said rotating members is in the form of a roller.

4. A bearing type wheel according to claim 1, wherein said silicon nitride ($Si_3N_4$) base ceramic includes alumina ($Al_2O_3$) and yttria ($Y_2O_3$).

5. A kiln car wheel as claimed in claim 1, wherein said finished surface of said rotating members has a surface roughness (Ra) within the range of from 0.05 to 0.2.

6. A bearing type kiln car wheel comprising:

an inner ring installed on an axle of a car said inner ring having an outer circumferential surface and rotates with said axle;

an outer ring disposed concentrically with said inner ring and having an inner circumferential surface; and a plurality of rotating members interposed between said inner ring and said outer ring for rolling on said inner and outer circumferential surfaces of said inner ring and said outer ring;

wherein each of said rotating members consists essentially of a sintered body of silicon nitride ($Si_3N_4$) base ceramic; and wherein each of said rotating members has a finished surface roughness (Ra) greater than 0.05 which is rougher than a mirror finished surface.

7. A wheel according to claim 6, wherein each of said rotating members is in the form of a ball.

8. A wheel according to claim 6, wherein each of said rotating members is in the form of a roller.

9. A bearing type wheel according to claim 6, wherein said silicon nitride ($Si_3N_4$) base ceramic includes alumina ($Al_2O_3$) and yttria ($Y_2O_3$).

10. A bearing type kiln car wheel for a kiln car as claimed in claim 6, wherein said finished surface of said rotating members has a surface roughness (Ra) within the range of from 0.05 to 0.2.

11. A bearing type tunnel kiln car wheel comprising:

a pair of inner rings installed on an axle of a car which rotate therewith;

an intermediate ring installed on the axle of the car at a location between said inner rings;

an outer ring disposed concentrically with said inner rings and said intermediate rings to define a pair of annular spaces between said respective inner rings and said outer rings; and a plurality of rotating members installed in said annular spaces;

wherein each of said rotating members consists essentially of a sintered body of silicon nitride ($Si_3N_4$) base ceramic; and wherein each of said rotating members has a finished surface roughness (Ra) greater than 0.05 which is rougher than a mirror finished surface.

12. A wheel according to claim 11, wherein each of said rotating members is in the form of a ball.

13. A wheel according to claim 11, wherein each of said rotating members is in the form of a roller.

14. A bearing type wheel according to claim 11, wherein said silicon nitride ($Si_3N_4$) base ceramic includes alumina ($Al_2O_3$) and yttria ($Y_2O_3$).

15. A bearing type kiln car wheel as claimed in claim 11, wherein said finished surface of said rotating members has a surface roughness (Ra) within the range of from 0.05 to 0.2.

* * * * *